US009032988B2

(12) United States Patent
Bresnahan

(10) Patent No.: US 9,032,988 B2
(45) Date of Patent: May 19, 2015

(54) STACKABLE SHUTTLE VALVE

(75) Inventor: Kevin Bresnahan, Avon Lake, OH (US)

(73) Assignee: Parker Hannifin Corporation, Cleveland, OH (US)

(*) Notice: Subject to any disclaimer, the term of this patent is extended or adjusted under 35 U.S.C. 154(b) by 145 days.

(21) Appl. No.: 13/641,297

(22) PCT Filed: Mar. 23, 2011

(86) PCT No.: PCT/US2011/029528
§ 371 (c)(1),
(2), (4) Date: Oct. 15, 2012

(87) PCT Pub. No.: WO2011/129966
PCT Pub. Date: Oct. 20, 2011

(65) Prior Publication Data
US 2013/0032222 A1     Feb. 7, 2013

Related U.S. Application Data

(60) Provisional application No. 61/323,982, filed on Apr. 14, 2010.

(51) Int. Cl.
    *F15B 13/00*     (2006.01)
    *F16K 27/00*     (2006.01)
    *F15B 13/02*     (2006.01)

(52) U.S. Cl.
    CPC .............. *F16K 27/003* (2013.01); *F15B 13/028* (2013.01)

(58) Field of Classification Search
CPC . F15B 13/028; F15B 13/0803; F15B 13/0817
USPC ........... 137/87.01, 87.06, 112, 113, 270, 271, 137/614, 884, 597
See application file for complete search history.

(56) References Cited

U.S. PATENT DOCUMENTS 1,686,310 A   *   10/1928   Beebe
2,358,228 A   *   9/1944   Hoof ............................. 137/113
(Continued)

FOREIGN PATENT DOCUMENTS

EP     00611351     11/1992
EP     00656847     8/1993

OTHER PUBLICATIONS

International Search Report for corresponding Patent Application No. PCT/US2011/029528 dated Jun. 27, 2011.
(Continued)

*Primary Examiner* — Craig Schneider
*Assistant Examiner* — R. K. Arundale
(74) *Attorney, Agent, or Firm* — Renner, Otto, Boisselle & Sklar, LLP

(57) ABSTRACT

A unitary stacked shuttle valve body assembly that may be used in a well drilling blow out preventer circuit. The assembly includes substantially similar shuttle valves that may be assembled and arranged in various configurations to accommodate the requirements and restrictions of the particular circuit in which the assembly may be used. Inlet ports and outlet ports are substantially coaxial and are assembled with central seal connectors that permit rotation of the valve bodies relative to one another. Feed passages, connector passages, and main passages are provided with plugs of different configuration to permit changing port configuration to accommodate the requirements and restrictions of the circuit in which the assembly is used.

30 Claims, 2 Drawing Sheets

(56) References Cited

U.S. PATENT DOCUMENTS

| | | | |
|---|---|---|---|
| 2,551,045 A * | 5/1951 | Parker | 137/113 |
| 3,038,487 A * | 6/1962 | Gardner | 137/112 |
| 3,338,257 A * | 8/1967 | Ferguson | 137/112 |
| 3,410,294 A * | 11/1968 | Heideman et al. | 137/113 |
| 3,533,430 A | 10/1970 | Fredd | |
| 3,533,431 A * | 10/1970 | Kuenzel et al. | 137/113 |
| 3,633,606 A * | 1/1972 | Hay et al. | 137/113 |
| 3,642,020 A | 2/1972 | Payne | |
| 3,972,343 A | 8/1976 | Burge | |
| 4,253,481 A * | 3/1981 | Sarlls, Jr. | 137/112 |
| 4,467,825 A | 8/1984 | Boyd | |
| 4,566,530 A | 1/1986 | Gooden | |
| 5,038,827 A | 8/1991 | Heffner | |
| 6,257,268 B1 * | 7/2001 | Hope et al. | 137/112 |
| 6,318,400 B1 * | 11/2001 | Hope et al. | 137/112 |
| 6,371,149 B1 | 4/2002 | Gust | |
| 6,655,405 B2 | 12/2003 | Hollister | |
| 6,779,543 B2 | 8/2004 | Hollister | |
| 7,159,605 B2 | 1/2007 | Thrash | |
| 7,243,671 B2 * | 7/2007 | Thrash et al. | 137/112 |
| 8,397,742 B2 * | 3/2013 | Thrash et al. | 137/112 |
| 8,469,048 B2 * | 6/2013 | Bresnahan | 137/112 |
| 2005/0028864 A1 * | 2/2005 | Thrash et al. | 137/112 |
| 2009/0120357 A1 * | 5/2009 | Ikushima | 118/300 |

OTHER PUBLICATIONS

No Author, "Dampened Shuttle, Quick Dump, ROV Shuttle, & Stackable Shuttle Valves", DTL Catalog, Shuttles Section 4.

* cited by examiner

STACKABLE SHUTTLE VALVE

This application is a national phase of International Application No. PCT/US2011/029528 filed Mar. 23, 2011 and published in the English language, which claims priority of U.S. Provisional Application No. 61/323,982, filed Apr. 14, 2010.

CROSS REFERENCE TO RELATED APPLICATIONS

The present application claims the benefit of the filing date of U.S. Provisional Patent Application Ser. No. 61/323,982, filed Apr. 14, 2010, the disclosure of which is incorporated herein by reference in its entirety.

TECHNICAL FIELD

This invention relates to a shuttle valve that includes a shuttle that connects the higher pressure one of two inlet ports to an outlet port. More specifically, this invention relates to a shuttle valve in which the inlet ports are movable to different locations and to a stack of such shuttle valves.

BACKGROUND OF THE INVENTION

When a shuttle valve is used in a fluid system, the two inlet ports of the shuttle valve may be connected to different sources of fluid pressure. The different sources of fluid pressure may be at different pressure levels, and each of the pressure levels may increase or decrease with time. The shuttle closes fluid pressure communication between the lower pressure source inlet port and the outlet port. The shuttle also establishes and maintains fluid pressure communication between the higher pressure source inlet port and the outlet port. As used herein, the term fluid pressure communication with reference to two or more surfaces or volumes means that such surfaces or volumes are in relatively open fluid flow communication and/or at substantially similar pressure levels under normal operating conditions when such surfaces or volumes are in the described configuration. The terms inlet port or inlet and outlet port or outlet do not preclude fluid flow in a reverse direction such that an inlet becomes an outlet or an outlet becomes an inlet, unless the context otherwise so requires. The terms up, down, left and right are explanatory and do not preclude opposite sides or opposite directions, unless the context otherwise requires.

The shuttle, which may also be referred to as a valve member, may have a first at rest position and a second at rest position. In the first at rest position, the lower fluid pressure source may be connected to the first inlet port and the higher fluid pressure source may be connected to the second inlet port. In this configuration, a first valve surface of the poppet closes fluid pressure communication between the lower pressure source first inlet port and the outlet port while fluid pressure communication between the higher pressure source second inlet port and the outlet port is established and maintained. In the second at rest position, the relative pressure levels of the first and second inlet ports may reverse, so that the first inlet port may be at the higher pressure level and the second inlet port may be at the lower pressure level. In this configuration, a second valve surface of the shuttle poppet closes fluid pressure communication between the lower fluid pressure source second inlet port and the outlet port while fluid pressure communication between the higher fluid pressure source first inlet port and the outlet port is established and maintained. In this manner, the inlet port that is at the higher pressure level is connected to the outlet port.

The shuttle of the shuttle valve is moved between its first and second at rest positions in response to fluid pressure. More specifically, the shuttle is moved in response to the fluid pressure differential between the first inlet port and the second inlet port. Some shuttle valves may include biasing members to prevent movement of the shuttle poppet until a predetermined pressure differential between the inlet ports is reached. Additionally, shuttle valves may include cushioning devices to control the speed of movement of the shuttle.

Shuttle valves of this type may be used in any of several known applications. One such application is in drilling fields in which drilling rigs drill wells into the ground (including underwater surfaces) for locating and connecting to underground fluid resources such as oil or natural gas or for locating and connecting to underground chambers to pump fluids into the chambers for storage. In these uses, the shuttle valve may be used as a component in a blow out preventer circuit that is designed to change fluid flow paths and prevent or limit over pressure conditions that might blow out piping or other components during instances of rapid high pressure build up in the well. A blow out preventer is any fluid circuit that operates in any application to change the path of fluid flow in response to fluid pressure change. A drilling field blow out preventer is any such blow out preventer that is used in connection with well drilling into the ground.

In some cases, an application requires that two or more shuttle valves be sequenced together, such that the outlet port of one shuttle valve will be directed to an inlet port of the next shuttle valve. In these cases, the shuttle valves are made to stack one adjacent the other, with their housings held together as a unitary valve body assembly. The term unitary valve body assembly means of a multi-piece construction of more than one valve body, assembled such that the multiple valve bodies function as a single valve body without external fluid hoses or other external fluid pressure lines. The term unitary stacked shuttle valve body assembly means a unitary valve body assembly in which each of the valve bodies is a shuttle valve body secured to at least one adjacent shuttle valve body with the outlet of one shuttle valve being connected to the inlet of an adjacent shuttle valve.

When shuttle valves are stacked together, constraints including space constraints may limit how the assembly can be installed or connected or may make certain installation configurations more desirable than others. In certain known prior art unitary stacked shuttle valve body assemblies, the assembly has only a single fixed port configuration, and the installation must be arranged or modified in order to accommodate the fixed port configuration. For example, FIG. 12 of U.S. Pat. No. 6,257,268 B1 illustrates a prior art unitary stacked shuttle valve body assembly. The outlet ports of each of the shuttle valves of this prior art assembly become internal inlets to its adjacent shuttle valve. In this prior art assembly, a middle one of the shuttle valve bodies cannot be assembled in different positions relative to the other shuttle valve bodies in order to move the location of its external inlet port. Also, the illustrated internal and external inlet connections for each shuttle valve body in this prior art assembly cannot be interchanged to allow changing the external inlet from one side of the shuttle valve body to the other.

SUMMARY OF THE INVENTION

The present invention provides a shuttle valve and a unitary stacked sequence shuttle valve body assembly that may be assembled in different configurations to meet the requirements and restrictions of the system in which it is utilized.

The shuttle valve may include a body and a shuttle. The body may have an outer surface, a first inlet port, a second inlet port, and an outlet port. The ports may each have a longitudinal axis. A cavity may be arranged in the body and may be connected by passages to the ports so that fluid flows through the cavity when passing from the first inlet port to the outlet port and when passing from said second inlet port to said outlet port. The shuttle may be movably disposed in the cavity in response to fluid pressure and may have a first position closing one of the first and second inlet ports from the outlet port and enabling fluid flow from the other of the first and second inlet ports to the outlet port. The outlet port may be substantially coaxial with one of the first and second inlet ports.

The outer surface of the body may include a first surface portion substantially disposed in a first plane and a second surface portion substantially disposed in a second plane substantially parallel to and spaced from the first plane. The ports may each be disposed substantially at the outer surface. The outlet port may be disposed substantially at one of the planes, and the one of the first and second inlet ports may be disposed substantially at the other of the planes. The planes may be substantially perpendicular to the axes.

The outer surface may further include a third surface portion substantially disposed in a third plane. The third plane may be substantially non-parallel to the first and second planes, and the other of the first and second inlets may be disposed substantially at the third surface portion. The outer surface portion may further include a fourth surface portion substantially disposed in a fourth plane that is substantially parallel to and spaced from the third plane. A main passage portion may extend through the housing from the third surface portion to the fourth surface portion, and the cavity may be disposed along the main passage portion intermediate the third and fourth surface portions. The other of the first and second inlets may be disposed along the main passage portion on a side of the cavity nearer the third surface portion.

The third and fourth planes may be substantially parallel to the longitudinal axes. The main passage may intersect the longitudinal axes. The outlet port may extend from the surface portion to the cavity. A plug fitting may extend into the main passage from the fourth surface portion. The housing may further include a feed passage, a first connecting passage connecting the feed passage to the main passage on one side of the shuttle. The one of the first and second inlet passages that is coaxial with the outlet passage may connect to the feed passage. The plug fitting may selectively block and open fluid communication between the connecting passage and the one side of the shuttle.

The feed passage may be substantially parallel to the main passage. The first connecting passage may be substantially parallel to the longitudinal axes and may intersect the feed passage and the connecting passage. A second connecting passage may also be provided in the body, and the first and second connecting passages may intersect the feed passage and the main passage. The location at which the connecting passages intersect the main passage may be on opposite sides of the cavity.

The third and fourth planes may be substantially parallel to the longitudinal axes. The feed passage may extend through the housing between the third and fourth surface portions. First and second plug fittings may extend into opposite ends of the main passage from the first and second surface portions, respectively. Third and fourth plug fittings may extend into opposite ends of the feed passage from the third and fourth surface portions, respectively. One of the third and fourth plug fittings may block fluid pressure communication between the feed passage and one of the connecting passages. The connecting passages may each extend from one of the first and second surface portions.

Still further, another shuttle valve may be provided that is substantially similar to the first mentioned shuttle valve. The other shuttle valve may include each of the components of the first mentioned shuttle valve. The outlet port of the first mentioned shuttle valve may be in open fluid pressure communication with the inlet port of the other shuttle valve, and the longitudinal axes of each of the shuttle valves may be coaxial. Still another shuttle valve may be provided that is substantially similar to the first mentioned shuttle valve. The still other shuttle valve may also have all of the defined components of the first mentioned shuttle valve, and the inlet port of the first mentioned shuttle valve may be in open fluid pressure communication with the outlet port of the still other shuttle valve. The longitudinal axes of the outlet ports and of the one of the inlet ports of each of the shuttle valves may be substantially coaxial. A fitting may connect the outlet port of the one shuttle valve to the inlet port of another shuttle valve. Also, the longitudinal axes of connecting passages of each of the shuttle valves may be substantially coaxial. Further, the planes in which various ones of the surface portions of each of the shuttle valves are disposed may be substantially coplanar. The assembled shuttle valves provide a unitary stacked sequence shuttle valve body assembly that may be altered to fit the requirements and restrictions of the installation in which it is used.

The invention provides various ones of the features and structures described above and in the claims set out below, alone and in combination, and the claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
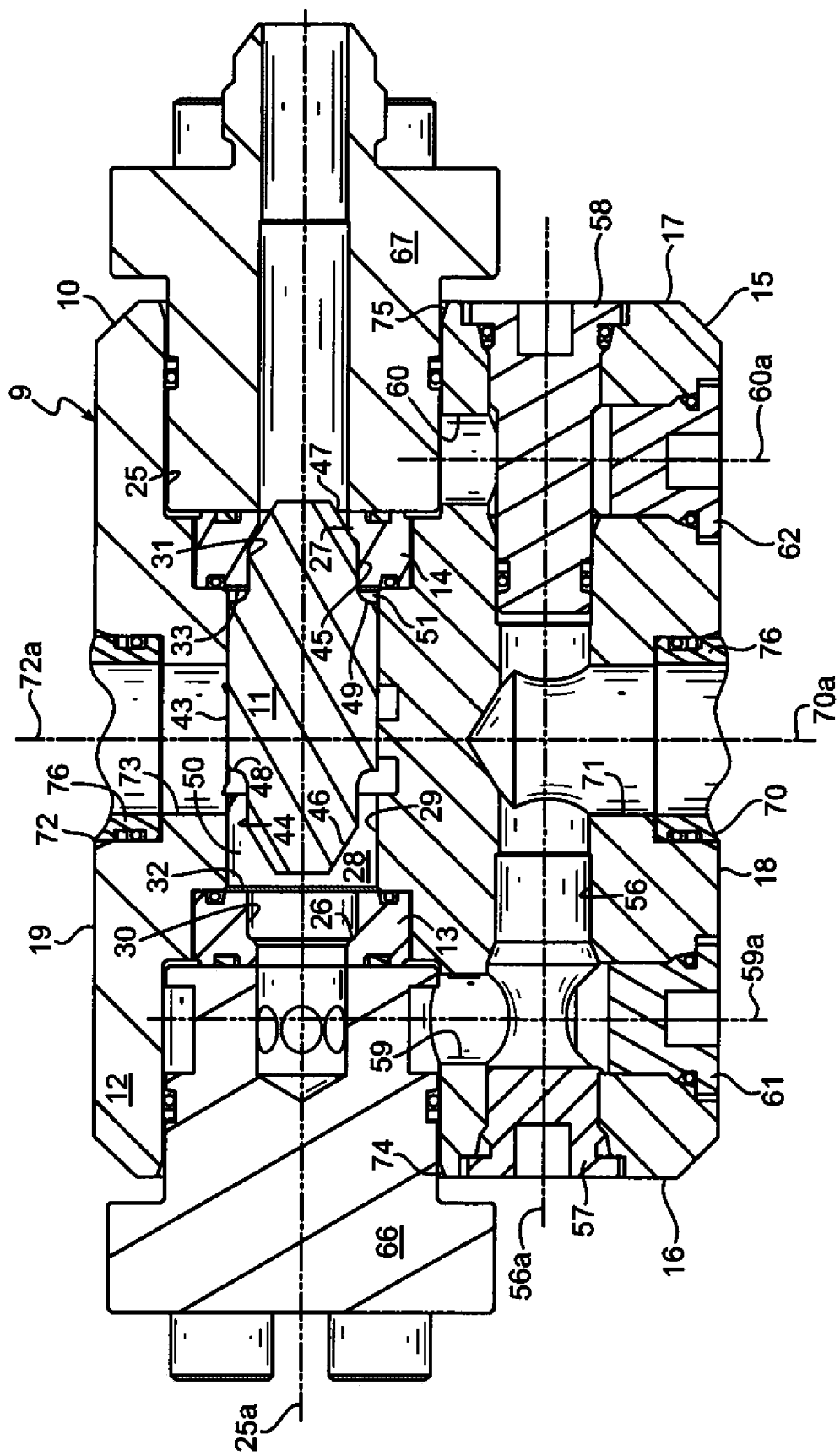
FIG. 1 is cross-sectional view of a presently preferred embodiment of a shuttle valve incorporating certain principles of this invention and arranged in one configuration.

Referring now to the drawings in greater detail, FIG. 1 illustrates a shuttle valve 9 having a valve body 10 and a shuttle 11. The valve body 10 and shuttle 11 are of any suitable material, which is selected in a well known manner to accommodate the pressures, flow rates, temperatures, fluids, external environment, body and shuttle size, pipe or tube type and size and thread configuration or flange configuration used to connect the valve body 10 to other components, and other factors. In the preferred embodiment, the shuttle valve 9 accommodates, for example, fluid pressures up to 5,000 pounds per square inch and connects with pipe or tubing of ¼ inch through 1½ inch (Society of Automotive Engineers tube sizes 4 through 24). Unless otherwise mentioned or obvious from the description and drawings, the components of the shuttle valve 9 other than the shuttle 11 are preferably of machined 316 stainless steel material.

The valve body 10 in the preferred embodiment is constructed from multiple components for ease of machining and assembly, although at least some of the components could be a single piece unitary construction. The valve body 10 includes a housing 12, two identical cylindrical valve seat members 13 and 14 described further below, and plugs that are also described below. The housing 12 includes an outer surface 15 of, for example, generally rectangular block configuration. The outer surface 15 includes first and second surface portions 16 and 17, which are generally flat, planar smooth surfaces that are disposed substantially in planes that are substantially parallel to and spaced apart from one another. The outer surface 15 also includes third and fourth surface portions 18 and 19, which are generally flat, planar smooth surfaces that are substantially disposed in planes that are substantially parallel to and spaced apart from one another and that are non-parallel to and preferably substantially perpendicular to the planes in which the surface portions 16 and 17 are disposed. A machined main passage 25 having a longitudinal axis 25*a* extends axially from end to end through the housing 12 between the outer surface portions 16 and 17. The valve seats 13 and 14 are disposed in the main passage 25. The valve seat members 13 and 14 provide annular valve seats 26 and 27, respectively. A central cavity 28 of the main passage 25 extends between the valve seats 26 and 27. The central cavity 28 includes a larger diameter portion 29 and reduced diameter portions 30 and 31. The intersection of the larger diameter portion 29 with the reduced diameter portions 30 and 31 provides annular radial walls 32 and 33.

The valve seat members 13 and 14 are slidably received in the main passage 25 and are secured in place by plugs further described below. Any suitable structure for securing the plugs in the main passage 25, such as pressing or threading or otherwise assembling these components, may be used. The valve seat members 13 and 14 and the various plugs described further below each carry one or more polymeric seal devices to restrict fluid leakage. Any suitable seal devices can be used, such as, for example, O-rings or molded in place seals of a suitable material such as nitrile rubber or a combination of a nitrile rubber seal and a back up ring of a suitable thermosetting material such as polytetrafluoroethylene.

The shuttle 11 is preferably of 17-4 precipitation hardened stainless steel, which has 17% chromium and 4% nickel, known as American Iron and Steel Institute 630 stainless steel. The shuttle 11 includes a larger diameter cylindrical central portion 43, first and second smaller diameter radially outwardly facing cylindrical surfaces or neck portions 44 and 45, and first and second conical nose portions 46 and 47. As further described below, the conical nose portions 46 and 47 provide first and second valve surfaces for the shuttle 11. The larger diameter central portion 43 and the smaller diameter surfaces 44 and 45 are connected by annular walls 48 and 49, respectively. As further described below, the first smaller diameter radially outwardly facing surface 44 of the shuttle 11 and the inwardly facing surface 29 of the valve body 10 and the annular walls 48 and 32 cooperatively define a variable volume cushioning cavity 50 when the shuttle 11 is in a leftward at rest position as viewed in FIG. 1. A controlled annular clearance is provided between the surfaces 43 and 29, and another controlled annular clearance is provided between the surfaces 30 and 44. These controlled annular clearances provide a leakage fluid flow path for fluid flowing out of the cushioning cavity 50. Similarly, as further described below, the second smaller diameter radially outwardly facing surface 45 of the shuttle 11 and the radially inwardly facing surface 29 of the valve body 10 and the annular walls 49 and 33 cooperatively define a variable volume cushioning cavity 51 when the shuttle 11 is in a rightward at rest position as shown in FIG. 1. A controlled annular clearance is provided between the surfaces 43 and 29, and another controlled annular clearance is provided between the surfaces 31 and 45. These controlled annular clearances provide a leakage fluid flow path for fluid flowing out of the cushioning cavity 51.

Referring still to FIG. 1, the shuttle 11 is shown in its rightward at rest position. In this position, the fluid pressure on the left side of the shuttle 11 is higher than the fluid pressure on the right side of the shuttle 11. The higher pressure acts against the shuttle 11 and retains the shuttle 11 in this at rest position. In this position, the nose or valve seat or valve surface 47 engages the valve seat or valve surface 27 to isolate the lower pressure acting against the right side of the shuttle 11. The second valve seat 26 of the valve body 10 in this position is spaced from its associated valve surface 46 of the shuttle 11.

When the fluid pressure on the right side of the shuttle 11 increases to a pressure level above that on the left side of the shuttle 11, the shuttle 11 begins to move from its at rest position shown in FIG. 1 to an intermediate position. The higher fluid pressure acting against the net lateral cross sectional area of the shuttle 11 exposed to such higher pressure overcomes the opposing force created by the lower fluid pressure acting against the net lateral cross sectional area of the shuttle 11 exposed to such lower pressure. This unseats the valve surfaces 27 and 47 and exposes a larger diameter area of the shuttle 11, which is an area equal to the net lateral cross sectional area of the cylindrical portion 45, to the higher fluid pressure. The acceleration and velocity of this movement of the shuttle 11 is dependent upon a variety of factors, with the pressure differential between the two ends of the shuttle 11 being a primary determinant.

As this movement of the shuttle 11 continues, on the right side of the shuttle 11 the smaller diameter portion 45 of the shuttle 11 moves out of the reduced diameter portion 31 of the valve body 10. This exposes a still larger diameter area of the shuttle 11, which is an area equal to the net lateral cross sectional area of the cylindrical portion 43, to the higher fluid pressure. On the left side of the shuttle 11, the smaller diameter portion 44 of the shuttle 11 moves into the portion 30 to fully define the cushioning cavity 50 and to isolate the lower pressure on the left side of the shuttle 11. The volume of the cushioning cavity 50 is variable and is reduced as the shuttle 11 continues its movement from the intermediate position to the leftward at rest position. The fluid in the cushioning cavity 50 leaks from the cushioning cavity 50 during this movement, and the cushioning cavity 50 attains its minimum volume when the surfaces 46 and 26 engage and the shuttle 11 reaches its leftward at rest position.

The above description of the operation of the shuttle valve 9 is also generally applicable to the operation of the shuttle valve 9 when the shuttle 11 starts from and moves from its leftward at rest position in which the valve surfaces 26 and 46 engage through an intermediate position and back to the one at rest position shown in FIG. 1. In this case, the pressure differential reverses and pressure on the left side of the shuttle 11 becomes the higher pressure. This higher pressure causes the shuttle 11 to begin its movement to the right, and the valve surface 46 moves away from the valve surface 26 to open the valve. As the movement of the shuttle 11 continues its movement to the right back toward the one at rest position shown in FIG. 1, the cushioning cavity 51 is again formed in an intermediate position. The shuttle 11 reaches its rightward rest position when the valve surfaces 47 and 27 engage. If desired, the cushioning passages shown and described in co-pending U.S. patent application Ser. No. 12/633,058 (EFS ID 6592726), filed Dec. 8, 2009, the disclosure of which is incorporated herein by reference, may be utilized in the shuttle valve 9.

As further shown in FIG. 1, the valve body 10 also includes a feed passage 56 which has a longitudinal axis 56a and which extends from end to end through the housing 12 between surface portions 16 and 17. The longitudinal axis 56a of the feed passage 56 is preferably parallel to and spaced from the main passage 25. The terminal ends of the feed passage 56 at the surface portions 16 and 17 are closed by plugs 57 and 58, respectively. The plugs 57 and 58 are threaded into the feed passage 56 and prevent leakage from the feed passage 56.

Connector passages 59 and 60 extend into the housing 12 from the surface portion 18 and intersect the main passage 25 and the feed passage 56. The connector passages 59 and 60 have longitudinal axes 59a and 60a, respectively, which are substantially perpendicular to the longitudinal axes 56a and 25a. Plug 57 is a flow through plug, which allows fluid pressure and flow communication between the feed passage 56 and the connector passage 59. Plug 58 is a flow stop plug, which isolates fluid pressure and flow between the feed passage 56 and the connector passage 60. The terminal ends of the connector passages 59 and 60 at the surface portion 18 are closed by plugs 61 and 62, respectively, which are threaded into the connector passages and prevent leakage to the exterior of the housing 12. Alternatively, the body 10 may be of any other suitable construction, such as a cast construction with passages cast in the body. In a cast construction, the passages 59 and 60 may be cast within the body 10 and may not require plugs 61 or 62.

The terminal ends of the main passage 25 at the surface portions 16 and 17 are sealed against leakage to the exterior of the housing 12 by plugs 66 and 67, respectively. The plugs 66 and 67 are each fastened in place by four screws, the heads of two such screws for each of the plugs 66 and 67 being illustrated in FIG. 1. Plug 66 is a flow through plug, which establishes fluid pressure communication between the connecting passage 59 and the main passage 25 on the left side of the shuttle 11. This fluid pressure communication is provided by an annular groove on the exterior of the plug 66 and by radial holes that extend from the annular groove to a longitudinal plug passage that opens to the main passage 25 and is coaxial with the axis 25a. Plug 67 is a flow stop plug, which isolates pressure and flow between the connector passage 60 and the main passage 25 on the right side of the shuttle 11. Plug 67 includes an internal passage which connects to the right side of shuttle 11, and plug 67 includes known connector surfaces for being connected to a mating fluid fitting (not shown).

The housing 12 further includes an inlet port 70 which is located substantially at the surface portion 18. The inlet port 70 includes an inlet passage 71 and has a longitudinal axis 70a that is substantially perpendicular to the surface portion 18 and extends to the feed passage 56. The housing further includes an outlet port 72 which is located substantially at the surface portion 19. The outlet port 72 includes an outlet passage 73 and has a longitudinal axis 72a that is substantially perpendicular to the surface portion 19 and extends to the main passage 25. The longitudinal axes 70a and 72a are substantially coaxial. The terminal ends of the main passage 25 at the location of the surface portions 16 and 17 provide external inlet ports 74 and 75, which are arranged so that one of the inlet ports (75 in the configuration illustrated in FIG. 1) is in fluid communication with one end of the shuttle 11 (the right end as illustrated in FIG. 1) and the other such inlet port (74 in the configuration illustrated in FIG. 1) is blocked from the shuttle 11. When the inlet port 74 is blocked as illustrated in FIG. 1, the inlet port 70 is in fluid communication with the other end of the shuttle 11 (the left end as illustrated in FIG. 1) so that the inlet port 70 becomes the inlet port on the left side of the shuttle 11.

Figure 2:
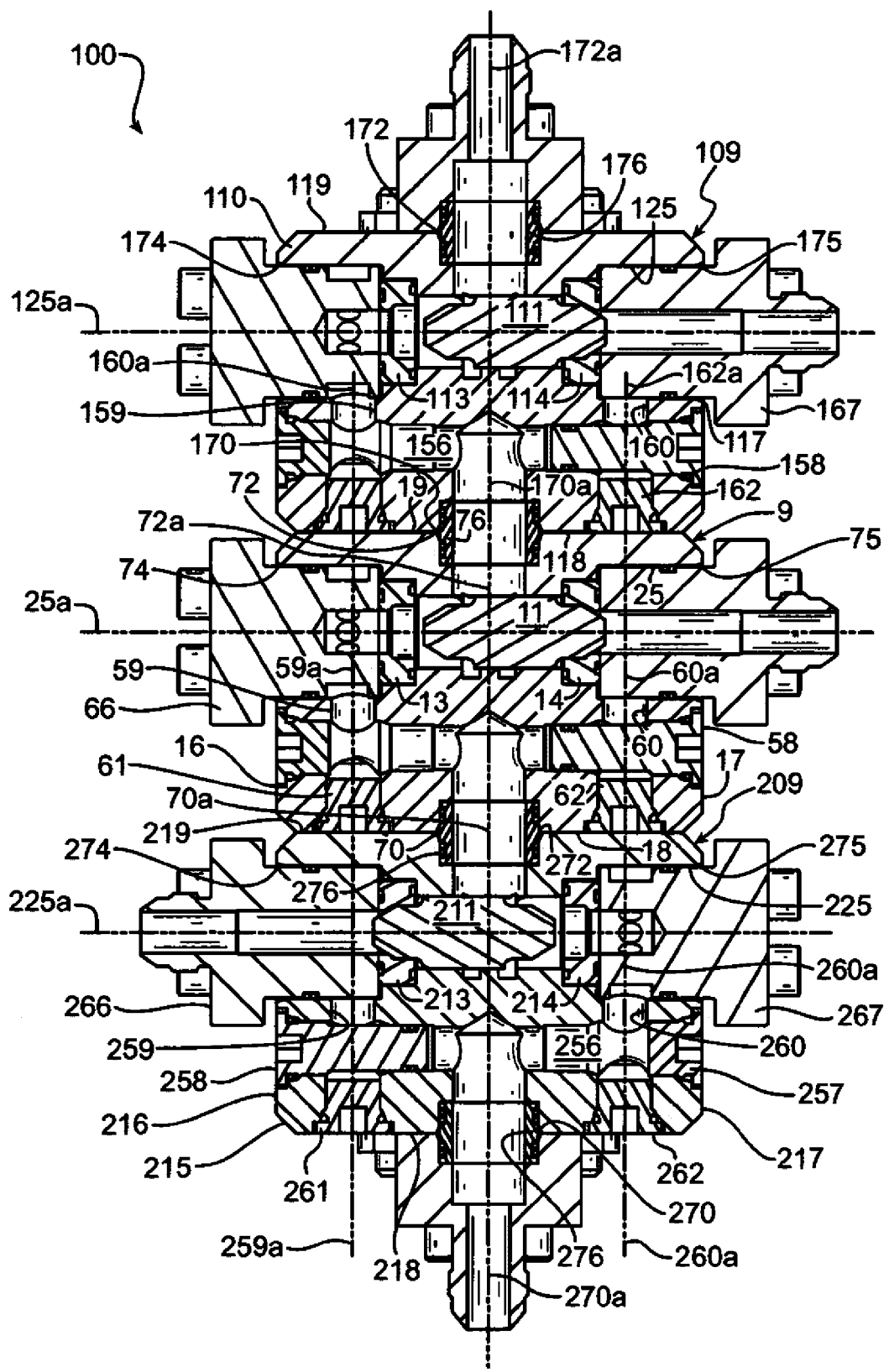
FIG. 2 is a cross-sectional view of an assembled stack of shuttle valves of the type shown in FIG. 1 and arranged in various configurations, with the assembled stack providing a unitary stacked shuttle valve body assembly.

Referring now to FIG. 2, the shuttle valve 9 is shown assembled to and arranged between substantially similar shuttle valves 109 and 209 to form a unitary stacked sequence shuttle valve body assembly 100. The shuttle valves 9, 109 and 209 are held together by assembly bolts (not shown) which extend axially through the shuttle valves. The arrangement of three shuttle valves 9, 109 and 209 shown in FIG. 2 may be altered to include a unitary stacked sequence shuttle valve body assembly with just two shuttle valves or with any other number of shuttle valves, all of which are stacked and connected in the manner illustrated in FIG. 2. The reference numbers and description above with respect to FIG. 1 apply to shuttle valve 109, with the same components being indicated by the same reference number with a prefix "1." Similarly, the reference numbers and description above with respect to FIG. 1 apply to shuttle valve 209, with the same components being indicated by the same reference number with a prefix "2." The components of the shuttle valves 9, 109 and 209 are identical but are assembled in different configurations, as further described below. In the unitary stacked sequence shuttle valve body assembly 100, the outlet port 72 of shuttle valve 9 is connected to the inlet port 170 of shuttle valve 170 by central sealing assembly or connector 76. Similarly, the outlet port 272 of shuttle valve 209 is connected to the inlet port 70 of the shuttle valve 9 by central sealing connector 276.

As further illustrated in FIG. 2, the shuttle valves 9, 109 and 209 may each be configured differently with different external port configurations or may be configured the same. The shuttle valves 9 and 109 are configured the same as each other, with the external inlet ports 75 and 175 both being disposed on the right side of the assembly 100. However, the shuttle valve 209 is configured in a different manner, so that the inlet port 274 on the left side of the assembly is provided as the external inlet port for the shuttle valve 209. This configuration for the shuttle valve 209 is achieved by interchanging the plugs 266 and 267 and by interchanging the plugs 257 and 258, relative to their positions in shuttle valves 9 and 109. In the configuration of shuttle valve 209, the inlet port on the left side is connected to the main passage 25 on the left side of the shuttle 211. Flow and pressure from the inlet 270 is communicated through the feed passage 256 and the connecting passage 260 to the right side of the shuttle 211, so that the inlet 270 becomes the inlet for the right side of the shuttle 211. The inlet port reversal allows the assembly 100 to adapt to the requirements or preferences of the particular circuit in which it is used.

In the assembly 100, the longitudinal axis of each inlet port 70, 170 and 270 is coaxial with the longitudinal axis of its respective outlet port 72, 172 and 272. Further, the longitudinal axes 70a, 72a of the shuttle valve 9 are coaxial with the longitudinal axes 170a, 172a of the shuttle valve 109 and with the longitudinal axes 270a, 272a of the shuttle valve 209. This enables any of the shuttle valves 9, 109 and 209 to be rotated about these axes relative to one another, providing still additional design configurations for the assembly 100 to accommodate the particular circuit in which the assembly 100 is installed. This further permits the assembly 100 to be altered to fit the requirements and constraints of the circuit in which it is used, instead of requiring that the circuit be altered to fit the external port configuration of the assembly 100. In the preferred embodiment illustrated in FIG. 2, there are four equally spaced axially extending assembly bolts (not shown) that secure the shuttle valves 9, 109 and 209 in the configuration illustrated. Due to the symmetrical pattern of the four assembly holes (not shown) for receiving these assembly bolts, the described rotation may be in 45 degree increments.

The assembly 100 may be used in systems that require opening and closing fluid pressure communication among various components in the system. The assembly 100 may be particularly useful as a component in a blow out preventer circuit in drilling fields, in which drilling rigs drill wells into the ground (including underwater surfaces) for locating and connecting to underground fluid resources such as oil or natural gas or for locating and connecting to underground chambers to pump fluids into the chambers for storage. Specifically, the assembly 100 may be used as a component in a blow out preventer circuit that is designed to change fluid flow paths and prevent or limit over pressure conditions that might blow out piping or other components during instances of rapid high pressure build up in the well.

In this manner, the assembly 100 gives the end user flexibility in the installation and allows for multiple assembly configurations. The unitary valve body 10, 110, 210 includes central sealing assembly 76, 176, 276, and appropriate passages, plugs, and fittings which direct flow in the proper direction, in order to actuate the shuttles 11, 111, 211. The longitudinal axis of each of the connecting passages 59, 159, 259 are coaxial, and the longitudinal axis of each of the connecting passages 60, 160, 260 are coaxial. The plugs and fittings can be easily removed and re-inserted in another configuration, to change the order of inlet connections on the sides of the body for more flexibility. Additionally, by utilizing a central seal assembly, when an assembly is formed, the main bodies of the assembly can be rotated relative each other without affecting functionality, providing a further level of flexibility. This invention allows the inlet ports of each shuttle valve body 10, 110, 210 to be configured in a particular orientation that is required or convenient, at initial assembly, or can be modified in the field as well. The ability of the valve bodies to rotate provides additional freedom for configuring the assembly. Finally, both valve seats 13, 14; 113, 114; and 213, 214 in each body are removable and repairable.

Presently preferred embodiments of the invention are shown and described in detail above. The invention is not, however, limited to these specific embodiments. Various changes and modifications can be made to this invention without departing from its teachings, and the scope of this invention is defined by the claims set out below. Also, while the terms first and second, one and another, left and right are used to more clearly describe the structure and operation of the shuttle valves 9, 109 and 209 and the assembly 100, it should be understood these terms are used only for purposes of clarity and may be interchanged when referring to different sides of the shuttle valves and of the assembly.

What is claimed is:

1. A shuttle valve comprising: a body that is stackable with the body of another shuttle valve to form a stacked sequence shuttle valve body assembly, said body having an outer surface, a first inlet port, a second inlet port, an outlet port, said ports each having a center longitudinal axis in a flow direction, a cavity in said body, said cavity being connected by passages to said ports so that fluid flows through said cavity when passing from said first inlet port to said outlet port and when passing from said second inlet port to said outlet port; and only one valve member movably disposed in said body in response to fluid pressure, said valve member being a shuttle movably disposed in said cavity and having a first position closing one of said first and second inlet ports from said outlet port and enabling fluid flow from the other of said first and second inlet ports to said outlet port; said longitudinal axis of said outlet port being essentially coaxial with said longitudinal axis of one of said first and second inlet ports.

2. A shuttle valve as set forth in claim 1, wherein said ports are disposed substantially at said outer surface, said outer surface includes a first surface portion substantially disposed in a first plane, a second surface portion substantially disposed in a second plane substantially parallel to and spaced from said first plane, said outlet port is disposed substantially at one of said planes, and said one of said first and second inlet ports is disposed substantially at the other of said planes.

3. A shuttle valve as set forth in claim 2, wherein said planes are substantially perpendicular to said longitudinal axes of respective essentially coaxial ports.

4. A shuttle valve as set forth in claim 3, wherein said outer surface includes a third surface portion substantially disposed in a third plane, said third plane is non-parallel to said first and second planes, and said other of said first and second inlets is disposed substantially at said third surface portion.

5. A shuttle valve as set forth in claim 4, wherein said outer surface portion includes a fourth surface portion substantially disposed in a fourth plane substantially parallel to and spaced from said third plane, a main passage portion extends through a housing from said third surface portion to said fourth surface portion, said cavity is disposed along said main passage portion intermediate said third and fourth surface portions, and said other of said first and second inlets is disposed along said main passage portion substantially at said third surface portion.

6. A shuttle valve as set forth in claim 5, wherein said third and fourth planes are substantially parallel to said longitudinal axes of respective essentially coaxial ports.

7. A shuttle valve as set forth in claim 5, wherein said main passage intersects said longitudinal axes of respective essentially coaxial ports.

8. A shuttle valve as set forth in claim 7, wherein said outlet port being disposed substantially at one of said first and second surface portions extends from said surface portion to said cavity.

9. A shuttle valve as set forth in claim 5, including a plug fitting, said plug fitting extends into said main passage from said fourth surface portion.

10. A shuttle valve as set forth in claim 5, wherein said housing includes a feed passage, a first connecting passage connects said feed passage to said main passage on one side of said shuttle, and said one of said first and second inlet passages that is essentially coaxial with said outlet passage connects to said feed passage.

11. A shuttle valve as set forth in claim 10, wherein said feed passage is substantially parallel to said main passage.

12. A shuttle valve as set forth in claim 11, wherein said first connecting passage is substantially parallel to said longitudinal axes of respective essentially coaxial ports, and intersects said feed passage and said main passage.

13. A shuttle valve as set forth in claim 10, wherein said outer surface includes a first surface portion substantially disposed in a first plane, a second surface portion substantially disposed in a second plane that is substantially parallel to and spaced from said first plane, said outlet port is disposed substantially at one of said planes, said one of said first and second inlet ports is disposed substantially at the other of said planes, said planes are essentially perpendicular to said longitudinal axes of respective essentially coaxial ports.

14. A shuttle valve as set forth in claim 13, wherein said outer surface includes a third surface portion substantially disposed in a third plane, said third plane is non-parallel to said first and second planes, said other of said first and second inlets is disposed substantially at said third surface portion, said outer surface portion includes a fourth surface portion substantially disposed in a fourth plane substantially parallel to and spaced from said third plane, a main passage portion extends through said housing from said third surface portion to said fourth surface portion, said cavity is disposed along said main passage portion intermediate said third and fourth surface portions, and said other of said first and second inlets is disposed along said main passage portion substantially at said third surface portion.

15. A shuttle valve as set forth in claim 14, wherein said third and fourth planes are substantially parallel to said longitudinal axes of respective essentially coaxial ports, said feed passage extends through said housing between said third and fourth surface portions.

16. A shuttle valve as set forth in claim 15, including first and second plug fittings extending into opposite ends of said main passage from said third and fourth surface portions, respectively.

17. A shuttle valve as set forth in claim 16, including third and fourth plug fittings extending into opposite ends of said feed passage from said third and fourth surface portions, respectively.

18. A shuttle valve as set forth in claim 17, wherein one of said third and fourth plug fittings block fluid pressure communication between said feed passage and one of said connecting passages.

19. A shuttle valve as set forth in claim 10, including interchangeable plug fittings selectively blocking and opening fluid communication between said connecting passage and said one side of said shuttle.

20. A shuttle valve comprising a body and a shuttle, said body being stackable with the body of another shuttle valve to form a stacked sequence shuttle valve body assembly;
   said body including a housing a first inlet ort a second inlet port, and an outlet port, said pods each having a longitudinal axis, a cavity in said body, said cavity being connected by passages to said ports so that fluid flows through said cavity when passing from said first inlet port to said outlet port and when passing from said second inlet port to said outlet;
   said shuttle being movably disposed in said cavity in response to fluid pressure and having a first position closing one of said first and second inlet ports from said outlet port and enabling fluid flow from the other of said first and second inlet ports to said outlet port;
   said outlet port being substantially coaxial with one of said first and second inlet ports;
   wherein said housing comprises:
      an outer surface including a first surface portion substantially disposed in a first plane, a second surface portion substantially disposed in a second plane substantially parallel to and spaced from said first plane, a third surface portion substantially disposed in a third lane and a fourth surface portion substantially disposed in a fourth plane substantially parallel to and spaced from said third plane, said first and second planes being substantially perpendicular to said longitudinal axes of respective substantially coaxial orts and said third and fourth .lanes be n non-parallel to said first and second planes,
      a main passage extending through said housing from said third surface portion to said fourth surface portion,
      a feed passage substantially parallel to said main passage said feed passage connecting to said one of the first and second inlet passages that is substantially coaxial with said outlet passage,
      a first connecting passage connecting said feed passage to said main passage on one side of said shuttle said first connecting passage being substantially parallel to said longitudinal axes of respective substantially coaxial ports; and
      a second connecting passage, said first and second connecting passages each intersect said feed passage and said main passage.

21. A shuttle valve as set forth in claim 20, wherein the location at which said connecting passages intersect said main passage is on opposite sides of said cavity.

22. A combination comprising shuttle valve as set forth in claim 1 and another shuttle valve that is substantially similar to said first mentioned shuttle valve, said other shuttle valve has each of the components of said first mentioned shuttle valve, said outlet port of said first mentioned shuttle valve being in open fluid pressure communication with the inlet port of said other shuttle valve, and said longitudinal axes of respective essentially coaxial ports of each of said shuttle valves being essentially coaxial.

23. The combination as set forth in claim 22, including still another shuttle valve that is substantially similar to said first mentioned shuttle valve, said still other shuttle valve has each of the components of said first mentioned shuttle valve defined in one of said preceding claims, said inlet port of said first mentioned shuttle valve being in open fluid pressure communication with the outlet port of said still other shuttle valve, and the longitudinal axes of respective essentially coaxial ports of each of said shuttle valves being coaxial.

24. The combination as set forth in claim 22, including a fitting connecting said outlet port of said first mentioned shuttle valve to said inlet port of said other shuttle valve.

25. The combination as set forth in claims 22, wherein the bodies of said first mentioned shuttle valve and said other shuttle valve provide a unitary stacked sequence shuttle valve body assembly.

26. The combination as set forth in claim 23, wherein the bodies of said first mentioned shuttle valve and said other shuttle valve and said still other shuttle valve provide a unitary stacked sequence shuttle valve body assembly.

27. A combination comprising a shuttle valve as set forth in claim 12 and another shuttle valve that is substantially similar to said first mentioned shuttle valve, said other shuttle valve has each of the components of said first mentioned shuttle valve defined in one of said preceding claims, said outlet port of said first mentioned shuttle valve being in open fluid pressure communication with the inlet port of said other shuttle valve, said longitudinal axes of said outlet port and said one of said inlet ports of each of said shuttle valves being essentially coaxial, said first connecting passages each having a longitudinal axis, and said longitudinal axis of each of said first connecting passages being coaxial.

28. A shuttle valve comprising a body and a shuttle;
   said body having an outer surface, a first inlet port, a second inlet port, an outlet port, a cavity in said body;
   said cavity being connected by first and second passages to said first inlet port;
   said shuttle being movably disposed in said cavity in response to fluid pressure and having a first position closing one of said first and second inlet ports from said outlet port and enabling fluid flow from the other of said first and second inlet ports to said outlet port;

a first plug fitting intermediate said first passage and said cavity blocking fluid communication between said first passage and said cavity, and a second plug fitting intermediate said second passage and said cavity connecting said second passage and said cavity.

29. A shuttle valve as set forth in claim 28, wherein said first and second plug fittings are interchangeable.

30. A shuttle valve as set forth in claim 28, wherein said housing includes a feed passage, said first inlet port is in fluid communication with said feed passage, and said first and second passages connect said feed passage to said cavity.

* * * * *

UNITED STATES PATENT AND TRADEMARK OFFICE
CERTIFICATE OF CORRECTION

PATENT NO. : 9,032,988 B2
APPLICATION NO. : 13/641297
DATED : May 19, 2015
INVENTOR(S) : Kevin Bresnahan Page 1 of 1

It is certified that error appears in the above-identified patent and that said Letters Patent is hereby corrected as shown below:

Claims

Claim 20, Column 11, line 41 the word "ort" should read --port--

Claim 20, Column 11, line 42 the word "pods" should read --ports--

Claim 20, Column 11, line 47 after the last word "outlet" add the word --port--

Claim 20, Column 11, line 61 the word "lane" should read --plane--

Claim 20, Column 11, line 65 the word "orts" should read --ports--

Claim 20, Column 11, line 66 the word ".lanes" should read --planes--

Claim 20, Column 11, line 66 the phrase "be n" should read --being--

Signed and Sealed this
Fifth Day of January, 2016

Michelle K. Lee
*Director of the United States Patent and Trademark Office*